United States Patent [19]

Bergmann

[11] Patent Number: 4,525,133

[45] Date of Patent: Jun. 25, 1985

[54] APPARATUS FOR PACKAGING ARTICLES

[76] Inventor: Conrad E. Bergmann, 1365 Lincoln Ave., San Jose, Calif. 95125

[21] Appl. No.: 427,695

[22] Filed: Sep. 29, 1982

[51] Int. Cl.³ .......................................... B29D 27/00
[52] U.S. Cl. ..................... 425/120; 53/122; 249/63; 249/82; 249/83; 249/117; 249/156; 249/159; 264/46.4; 264/46.9; 264/DIG. 83; 425/573; 425/817 R
[58] Field of Search .............. 264/46.4, 46.9, 46.6, 264/DIG. 83, 54, 51, 53; 249/83, 117, 121, 124, 63, 109, 82, 156, 159; 425/817 R, 120, 562, 573; 53/122, 140

[56] References Cited

U.S. PATENT DOCUMENTS

| | | | |
|---|---|---|---|
| 129,957 | 7/1872 | Holley | 249/121 X |
| 945,019 | 1/1910 | Connell | 249/109 X |
| 1,454,647 | 5/1923 | McFarland | 249/109 |
| 2,960,720 | 11/1960 | Jodell | 425/149 |
| 3,246,059 | 4/1966 | Moroni et al. | 264/54 X |
| 3,249,660 | 5/1966 | King | 264/51 |
| 3,268,635 | 8/1966 | Kraus et al. | 264/53 X |
| 3,480,704 | 11/1969 | Ludwig | 264/46.4 |
| 3,571,856 | 3/1971 | Voelker | 425/562 X |
| 3,642,400 | 2/1972 | Theodorsen | 264/46.4 X |
| 3,830,895 | 8/1974 | Theodorsen | 264/46.4 |
| 3,954,926 | 5/1976 | Pahl et al. | 264/46.4 |
| 3,970,732 | 7/1976 | Slaats et al. | 264/53 X |
| 4,002,289 | 1/1977 | Moore | 264/46.4 X |
| 4,046,942 | 9/1977 | Van Wersch | 264/46.9 X |
| 4,073,844 | 2/1978 | Wada et al. | 249/82 X |
| 4,136,141 | 1/1979 | Bauer et al. | 264/46.4 X |
| 4,153,657 | 5/1979 | Wilcox | 264/46.9 X |
| 4,240,999 | 12/1980 | Decker, Jr. | 249/109 X |
| 4,379,104 | 4/1983 | Koorevaar | 264/45.5 |
| 4,390,337 | 6/1983 | Gately | 264/46.4 X |
| 4,405,538 | 9/1983 | Saidla | 264/54 X |
| 4,412,962 | 11/1983 | Bessette et al. | 264/46.9 X |

FOREIGN PATENT DOCUMENTS

| | | | |
|---|---|---|---|
| 700133 | 12/1964 | Canada | 249/109 |
| 70971 | 4/1950 | Denmark | 249/109 |
| 307017 | 7/1919 | Fed. Rep. of Germany | 249/109 |
| 111021 | of 0000 | France | 249/109 |
| 466677 | 8/1967 | Japan | 264/46.9 |
| 47-47094 | 11/1972 | Japan | 425/817 R |
| 54-102355 | 11/1979 | Japan | 249/83 |
| 54-102357 | 11/1979 | Japan | 249/83 |
| 4425 | of 0000 | United Kingdom | 249/109 |
| 2438 | of 1868 | United Kingdom | 249/109 |
| 3286 | of 1873 | United Kingdom | 249/109 |
| 849362 | 9/1960 | United Kingdom | 249/109 |

OTHER PUBLICATIONS

*Encyclopedia of Polymer Science and Technology*, vol. 13, sections "Styrene Polymers (Special Products)"; subsections: Polystyrene Foams; Extruded Rigid Polystrene Foam; New York, Interscience, ©1970, pp. 428–431.

Primary Examiner—Philip Anderson
Attorney, Agent, or Firm—Jack M. Wiseman; Francis W. Anderson

[57] ABSTRACT

A packaging system for encapsulating an article within a solid foam material. An article to be encapsulated is supported on a base. A wall enclosure is disposed on the base to form a mold cavity. At the top of the base and above the article to be encapsulated is a cover. Expandable plastic foam in liquid form is introduced into an orifice of the base and the expandable plastic foam advances through a passageway in the base and is discharged from an orifice in the base into the mold cavity to encapsulate the article. The foam material in liquid form solidifies into a solid plastic foam material for packaging the article.

10 Claims, 13 Drawing Figures

APPARATUS FOR PACKAGING ARTICLES

BACKGROUND OF THE INVENTION

In the merchandising of articles, especially those purchased for gift purposes, it is necessary for the seller to provide a wrapping that is neat and attractive. This necessitates the maintenance of an expensive inventory of boxes of various sizes and other accessories such as tissue paper and ribbon. Further, considerable time is consumed when an article is wrapped following the usual procedures, and this time factor results in an excessively expensive wrapping operation and causes unhappy customers who must wait in line to have their items gift wrapped. It is an object of the present invention to provide a gift wrapping procedure that is economical and can be carried out relatively quickly.

In general the gift wrapping system of the present invention involves the use of a mold in which the article is encapsulated by a covering of rigid plastic foam. In one form, the mold features side walls that may be adjusted relative to each other to vary the size of the enclosure defined by the mold and also, the invention concerns the use of mold members of magnetic material which are effective to hold themselves in selected positions.

Molds which have adjustable side walls have been proposed for some time and are disclosed in the patents of Scheelky, U.S. Pat. No. 896,330, to Neistradt, U.S. Pat. No. 1,678,266, to Nicoli, U.S. Pat. No. 3,109,361, to Arps, U.S. Pat. No. 3,788,591, to Powers et al., U.S. Pat. No. 3,867,501, and to Theodorsen, U.S. Pat. No. 3,999,736. The patent to Isenberg, U.S. Pat. No. 2,032,483 discloses an insert for varying the depth of a mold, and the Swiss Pat. No. 276706 discloses a cover for a mold. The use of magnetic materials to hold building elements in selected positions is disclosed in the patents to Lepper, U.S. Pat. No. 3,196,579 and Fayling, U.S. Pat. No. 3,897,288. None of these patents disclose the adjustable mold of the present invention and particularly do not suggest the novel efficient means for directing material into the mold nor do they suggest the means for varying the height of the molded mass that is effectively employed in the gift wrapping system of the invention.

SUMMARY OF THE INVENTION

A packaging system features a mold, that is formed by side walls which can be adjusted to vary the size of the enclosed space, and includes a system for introducing plastic foam through the mold base into the mold enclosure.

DESCRIPTION OF A PREFERRED EMBODIMENT

Figure 1:
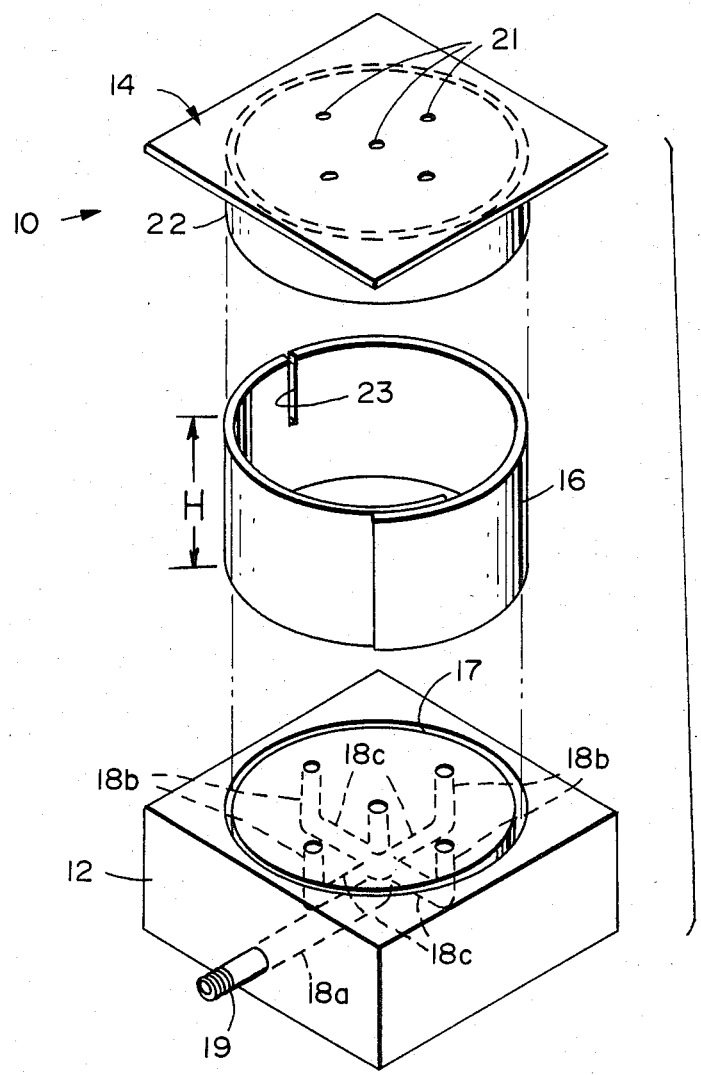
FIG. 1 is an exploded diagrammatic perspective of one embodiment of the present invention.
Figure 2:
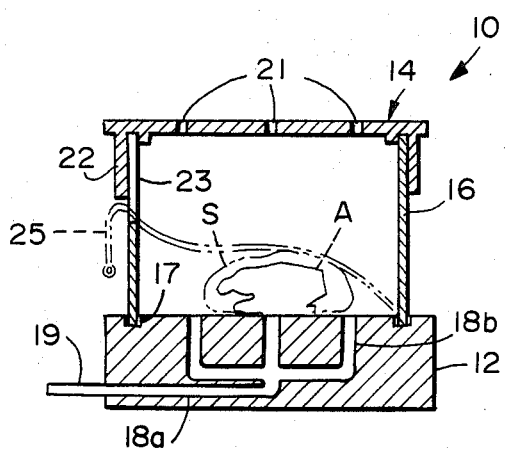
FIG. 2 is a diagrammatic vertical section taken through the base of the mold of FIG. 1.

In FIGS. 1 and 2, the reference numeral 10 indicates generally an article-wrapping device that is constructed in accordance with the present invention and includes a base 12, a cover 14 and an intermediate wall member 16. The base 12 is a solid, block-like member made of rigid material, such as aluminum, and has a cylindrical groove 17 formed in its upper surface. A passageway which is provided in the interior of the base comprises an inlet segment 18a and five upwardly-extending passages 18b that communicate directly or by means of laterals 18c with the inlet segment. A nipple 19 which is threaded into the segment 18a extends away from the base for connection to a source of foam in a liquid state.

The cover 14 is a rigid generally rectangular plate having a plurality of vent passages 21 extending therethrough and a cylindrical flange 22 integrally formed with or secured to the undersurface of the cover. The diameter of the inner surface of the flange 22 is equal to the outer diameter of the groove 17 in the base 12. The intermediate wall member 16 is an elongated thin sheet of metal which is resilient and tends to spring outwardly when it is folded into a generally cylindrical configuration as shown in FIG. 1. The wall member 16 has a slot 23, extending from adjacent its longitudinal centerline to one edge, that is adapted to receive a cord 25 (FIG. 2) which is anchored at one end to the lower edge of the wall member substantially opposite the slot.

The wrapping device 10 is put into operation by wrapping a thin sheet of material S around the article A, and placing the enclosed article on the base 12. The sheet S should be of a material that will not disintegrate or burn when subjected to excessive heat. The lower edge of the wall member 16 is then inserted into the groove 17, and the cord 25 is draped over the article with one end of the cord extending through the slot 23. When the cover 14 is positioned on the wall member 16 with the flange 22 enclosing the upper edge of the wall member, the device is ready to receive a plastic liquid foam, such as expandable polystyrene, through the inlet nipple 19. The plastic liquid is pumped into the upwardly-extending passage 18b through a valve-controlled conduit connected to nipple 19 and into the cavity enclosed by the wall member 16. When a predetermined quantity of liquid has entered the chamber, the inflow of the liquid is stopped and the liquid is allowed to expand, form a foam, and fill the chamber. The vent passages 21 in the cover permit gases to escape from the chamber.

When the foam has solidified, the cover 14 and the wall member 16 are removed from the base to expose the wrapped article. Subsequently, when the article A must be removed from its enclosure, the cord 25 is grasped and swung from side to side to cut through the foam to expose the upper surface of the wrapped article. The article is then lifted out of the package.

Figure 3:
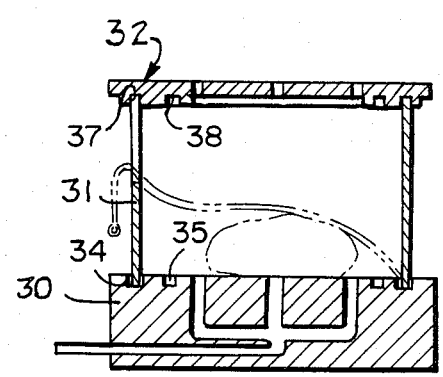
FIG. 3 is a view similar to FIG. 2 but showing a modified form of the mold.

In FIG. 3, a second embodiment of the wrapping device is shown which includes a base 30, a wall member 31, and a cover 32. The base 32 is identical to base 12 of FIGS. 1 and 2 except that two annular grooves 34 and 35 are provided in the upper surface of the base instead of one. The cover is similar to cover 14 in that it is a rigid flat member having a plurality of vent holes extending therethrough. Three annular flanges extend downwardly from the cover to define two annular grooves 37 and 38 which have the same diameters as the grooves 34 and 35, respectively, in the base 30. The wall member 31 is identical to wall member 16 and is adapted to be flexed into two alternate, generally cylindrical configurations—one adapting it to be engaged in confined relation by the grooves 34, 37 and the other configuration adapting it to be confined by the grooves 38, 35.

It will be evident that more than two sets of cooperating grooves may be provided if desired in the base and on the cover, and that each set of grooves will result in a package of a different diameter. Also, it will be evident that wall members having different heights H (FIG. 1) can be supplied if packages of different heights are desirable. Further, while a wall member that expands outwardly has been described, wall members that contract inwardly may also be used, and the grooves 34, 37 and 35, 38 will confine them in the desired positions.

Figure 4:
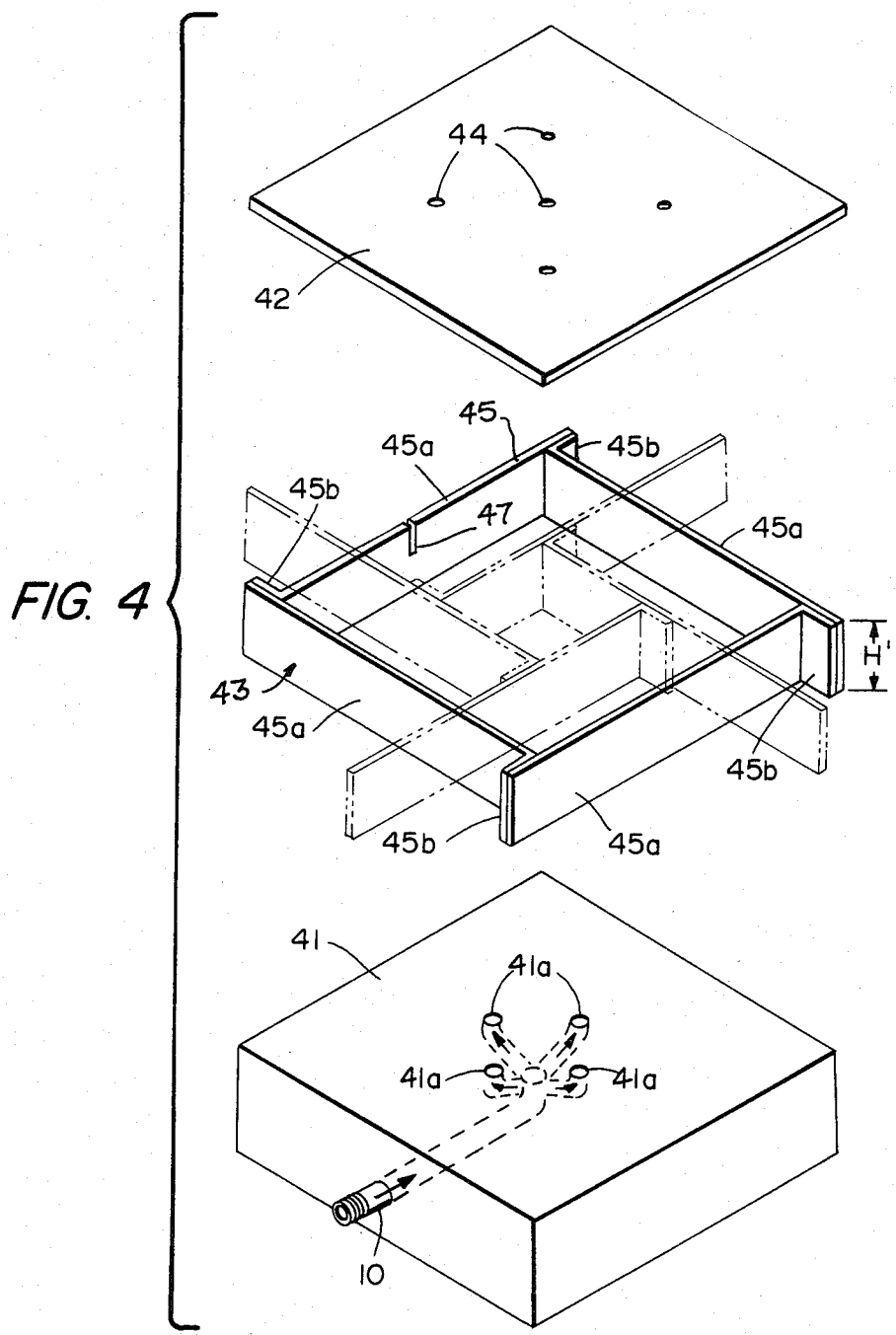
FIG. 4 is an exploded, diagrammatic perspective of another embodiment of the mold of the invention.

In FIG. 4 another embodiment of the packaging apparatus is shown. This apparatus includes a base 41, a cover 42, and a wall member 43. The base 41 is identical to the base 12 of FIGS. 1 and 2, the upper ends of the inlet conduits being indicated at 41a, while the cover 42 consists of a rectangular plate having a plurality of vent holes 44 therethrough.

The wall member 43 is made up of four identical elongate members 45, each of which includes a side wall 45a and a flange 45b integrally formed with the side wall member and projecting at right angles thereto. The members 45 are made of a magnetic metal material so that, when the four members are arranged in the pattern shown in solid lines in FIG. 4, the flanges 45b of one side member grips an adjacent side wall member 45a and magnetically locks the two members together. In this manner, a fixed chamber of square or rectangular cross-section is provided for receiving an article to be packaged, such as the article A of FIG. 2. To put the apparatus in operation, wall member 43 is placed on the base 41, an article that is enclosed in a protective covering is placed inside the chamber provided by the wall member 43, and the cover 42 is placed over the wall member. Then, when foam is pumped into the chamber, the article will be encapsulated in a rigid foam package that is square in cross-section and has a height equal to the height H' of the wall member.

A slot 47 is provided in one side wall member to receive a cord, identical to cord 25 (FIG. 2), which is secured to a lower edge of the opposite side wall member.

If a package having a smaller cross-section is desired, the magnetic grip of each of the flanges 45b with the adjacent side wall member 45a is temporarily broken and the members are moved to a new, desired setting such as that shown in phantom lines in FIG. 4. In the new setting the flanges 45b magnetically grip the adjacent wall member 45a to form a smaller, article-receiving chamber.

Figure 5:
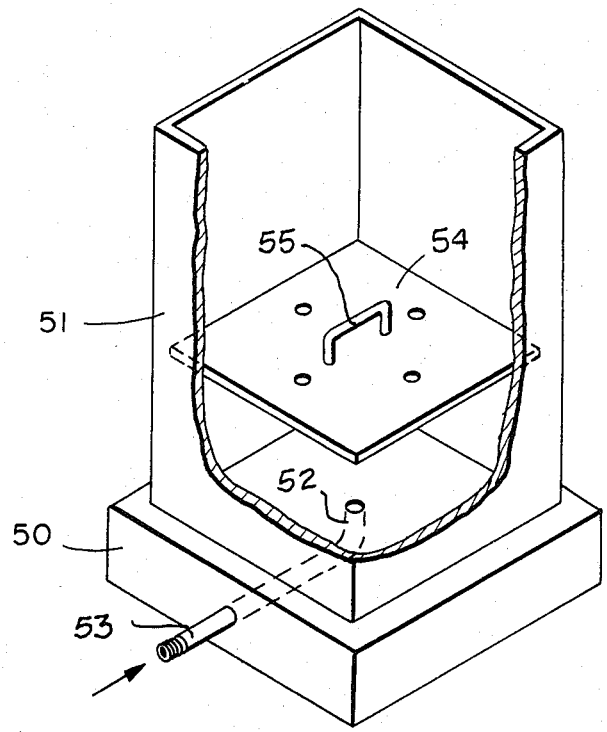
FIG. 5 is a diagrammatic perspective, partly broken away, of another embodiment of the mold.

In FIG. 5 an embodiment of the invention is disclosed which features a base 50 and a four-sided wall member 51 which is secured to and projects upwardly from the base.

The base 50 may be identical to the base 12 of FIGS. 1 and 2, but is illustrated as having only one upwardly extending passage 52 which communicates with an inlet conduit 53 for bringing plastic foam up into the chamber defined between the four walls of the wall member 51 and a cover 54. The cover has the same configuration as the opening defined between the four walls and is arranged to be lowered into the chamber by the operator who grips a handle 55 secured to the cover.

With the cover removed from the chamber, an article to be encapsulated is placed inside the four walls on the upper surface of the base. The operator then moves the cover down into the chamber to the level that will result in the formation of a package of a desired height, and manually holds the cover in this position while foam is directed into the chamber to enclose the article.

Again, a slot may be formed in one side wall to receive a cord (not shown), that is similar to cord 25 of FIG. 2 and is secured to the lower edge of the opposite side wall.

Suitable indicia or level lines may be provided on the inner or outer surface of the wall member 51 to indicate different package heights for the use of the operator in determining the proper position of the cover.

Figure 6:
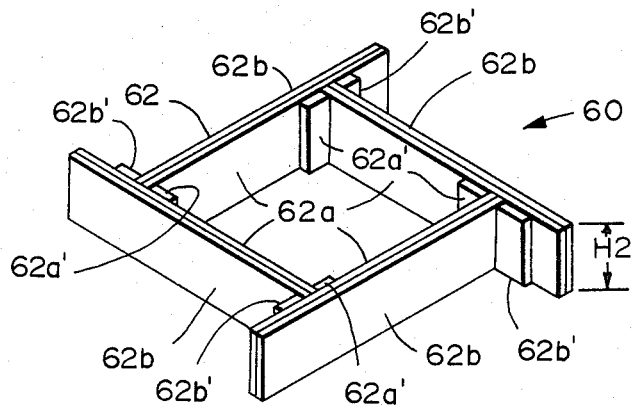
FIG. 6 is a diagrammatic perspective of another embodiment of the invention.
Figure 7:
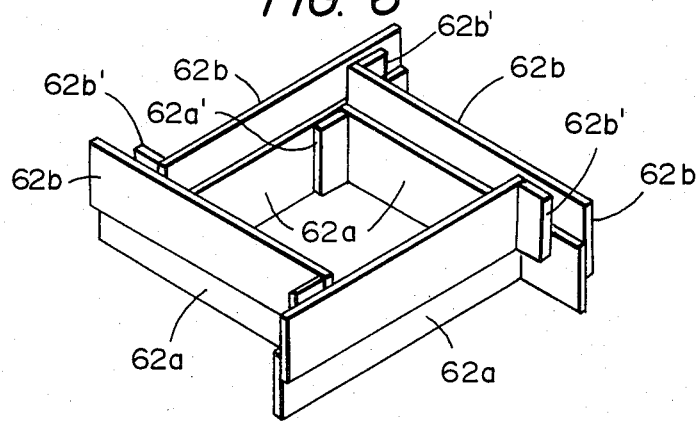
FIG. 7 is a diagrammatic perspective of the mold of FIG. 6 but showing the parts in an adjusted position.
Figure 8:
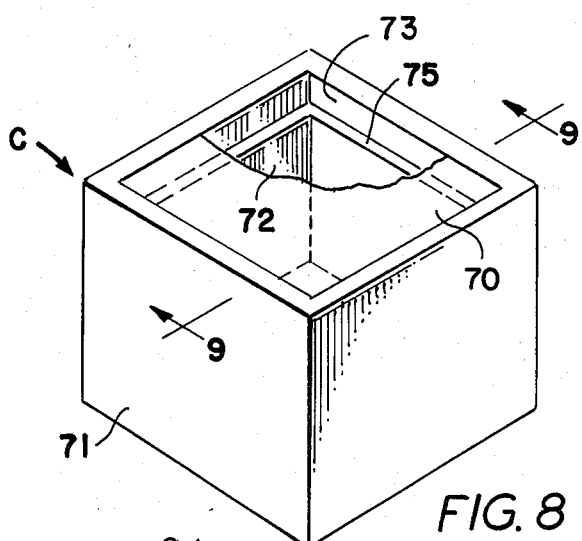
FIG. 8 is a diagrammatic perspective of a container made with molding apparatus of the present invention.
Figure 9:
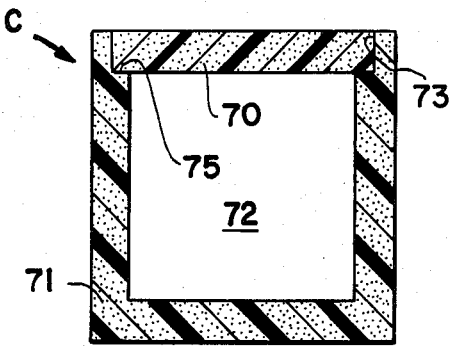
FIG. 9 is a diagrammatic section taken along line 9—9 of FIG. 8.
Figure 10:
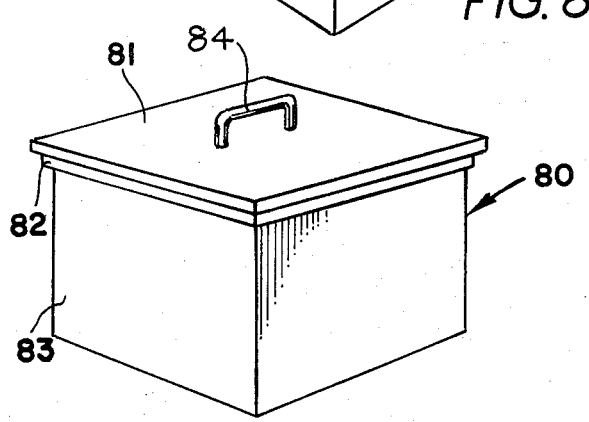
FIG. 10 is a diagrammatic perspective of a portion of the apparatus used to form the container of FIG. 8.

In FIGS. 6 and 7 a body member 60 is illustrated that may be used with the base 41 and cover 42 of FIG. 4. This body member includes four side walls 62, each wall including an inner member 62a and an outer member 62b. All of the members 62a and 62b are identical, being made of a relatively thin sheet of magnetic material and being elongate and generally rectangular in configuration.

In FIG. 6, each member is in flat, abutting engagement with the adjacent member 62b and is secured thereto by the magnetic attraction of the members. A flange 62a' on each member 62a engages an adjacent member 62 to hold the members 62a in fixed position. Further, a flange 62b' on each member 62b magnetically engages the flat inner face of an adjacent wall member 62a. With the four pairs of members so engaged, a chamber is provided for receiving an article to be encapsulated when the wall member is placed on a base and the packaging procedure mentioned above is put into operation. As a result, a package having a height H2 will be formed.

In FIGS. 8–11 another embodiment of the container-forming apparatus of the present invention is illustrated. The container C (FIGS. 8–11), which is to be formed by the apparatus, includes a cover 70 in the form of a plate of generally rectangular configuration, and a base 71 that is a box-like member having a bottom wall and four upstanding side walls that define an internal compartment 72. A recess 73 at the upper ends of the side walls provides a generally horizontal ledge 75 on which the cover 70 rests when the container is closed.

To form the base of container C, a mold is used which includes a material-supply base 76 (FIG. 11) that is identical to the base 12 of FIG. 2, except that it has no groove in its upper surface, and a wall member 77 which is similar to wall member 43 of FIG. 4 but has no slot similar to the slot 47 in member 43. The members of wall 77 are made of magnetic material so that, when they are arranged in a pattern such as that of FIG. 4, they grip each other and the base 76 to provide a space enclosed by the four walls.

Figure 11:
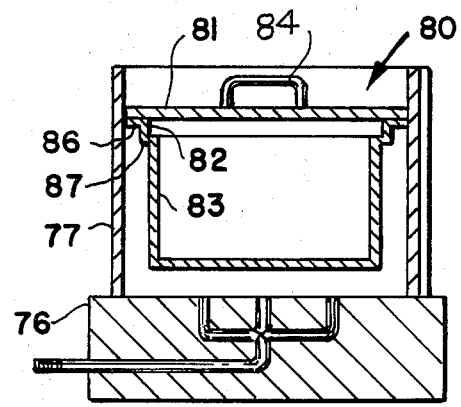
FIG. 11 is a diagrammatic vertical section taken centrally through the molding apparatus.

An adjustable molding member 80 is provided which includes a plate 81 of rectangular configuration at its upper end, an intermediate section 82 of generally rectangular transverse cross-section, and a lower member 83 that is also rectangular in cross-section and closed at its lower end. The dimensions and configuration of the sections 81, 82 and 83 are such that, as seen in FIG. 11, two downwardly facing ledges 86 and 87 are formed at the upper end of the molding member 80, with each ledge being of uniform width for its entire length around the member 80. Also, the dimensions of the sections 81, 82 and 83 are coordinated with the size of the opening enclosed by the wall 77 so that, when the molding member 80 is placed within that enclosure, the distance between the inner surface of the wall 77 and section 83 is constant completely around the mold, as is the distance between the inner surface of the wall 77 and section 82 of the molding member 80.

In forming a container, a wall member 77 is positioned on the base 76 and the molding member 80 is gripped by the handle 84 and lowered within the wall 77 to a depth such that the bottom surface of the member 83 is disposed a predetermined distance above the upper surface of the base 76.

Indicia or notches may be formed on the inner surface of the wall 77 to facilitate the correct positioning of the mold member 80. The associated control valve is then actuated to direct plastic foam into the chamber formed between the base 76, the mold member 80, and the wall member 77. It will be evident from a comparison of FIGS. 8 and 11 that, when the wall member 77 and the mold member 80 are properly chosen, the molded product will have the configuration of the base 71 of container C.

Figure 13:
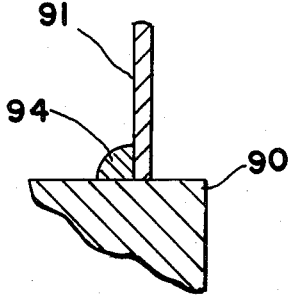
FIG. 13 is an enlarged fragmentary section taken through a portion of the apparatus of FIG. 12.
Figure 12:
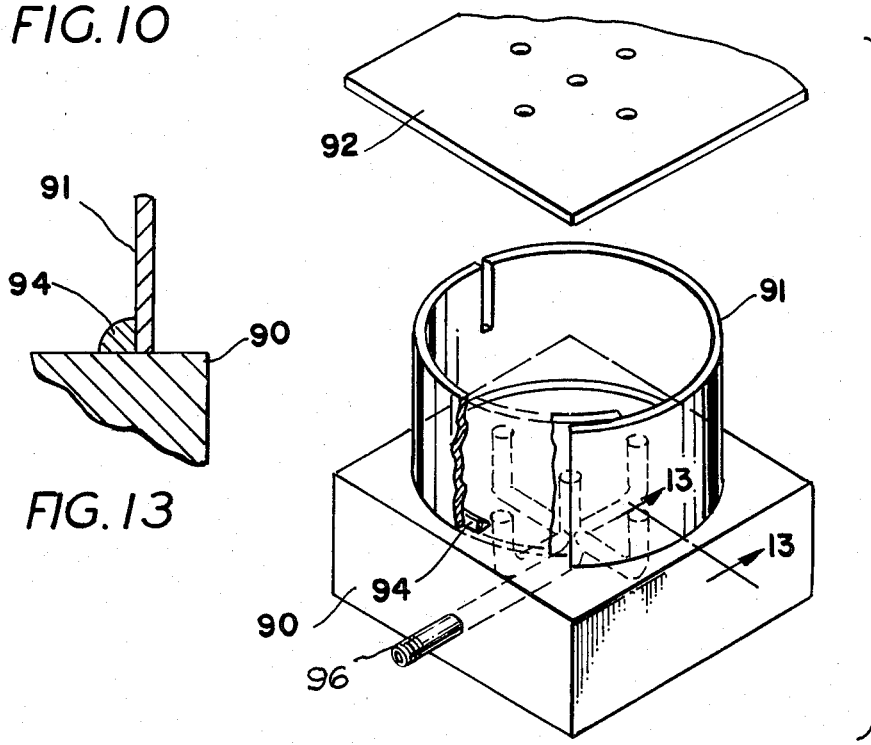
FIG. 12 is a diagrammatic exploded perspective of another embodiment of the packaging system of the present invention.

In FIGS. 12 and 13 a further embodiment of the present invention is illustrated. This embodiment is substantially identical to that of FIG. 1 in that it includes a base 90, a wall 91, and a cover 92. This embodiment differs from that of FIG. 1 in that the wall member 91 is an elongate thin sheet of metal which is bent into a substantially cylindrical form and is prestressed so that it tends to contract inwardly toward a smaller diameter. No grooves are formed in the upper surface of base 90 but a retainer ring 94, which is formed of magnetic material and is of fixed diameter, is disposed on the metal base in gripping engagement with the upper surface. As seen in FIG. 13, the ring 94 may be quarter-round in cross-section. If it is necessary to also limit the inward movement of the upper end of the wall 91, a ring (not shown) that is identical to ring 94 in size and construction may be placed in magnetic gripping engagement with the undersurface of the cover 92.

An article is encapsulated in a plastic expandable polystyrene foam by directing foam into the base 90 through a conduit 96 for redirection upwardly into the mold in the same manner as described in connection with FIGS. 1 and 2.

Containers of different heights and diameters can be made by choosing wall member 77 and retainer rings 94 of appropriate heights and diameters, respectively. The ring 94 could of course be substituted for the groove 17 of FIG. 17 to limit inward movement of an inward-collapsing wall member.

From the foregoing description it will be apparent that the present invention provides a simple relatively fast system for wrapping articles. The substantially smooth outer surface of the package gives it an appearance which makes it suitable as a gift wrapping with the addition of very little optional trimmings, such as bows or seasonal motifs which can be quickly applied to the outer surface of the package.

I claim:

1. A packaging system for encapsulating an article within a solid plastic foam material comprising:
   (a) a base adapted to support an article to be encapsulated within a solid plastic foam material, said base being formed with a passageway in communication with an inlet orifice formed in said base and in communication with an outlet orifice formed in said base;
   (b) a wall enclosure disposed on said base and surrounding the area adapted to support the article on said base, said wall enclosure being disposed to form a mold cavity in communication with said outlet orifice;
   (c) a cover disposed across the upper end of said wall enclosure above the article; and
   (d) means introducing an expandable plastic foam material in liquid form into said inlet orifice, said expandable plastic material in liquid form advances through said passageway and is discharged from said outlet orifice into the space defined by said wall enclosure, said cover and said base for encapsulating the article within the plastic foam material in liquid form, said plastic foam material in liquid form solidifies into a solid plastic foam material for packaging the article within the solid plastic foam material.

2. A packaging system as claimed in claim 1 wherein said wall enclosure is cylindrical in configuration and is inwardly biased toward positions enclosing areas of smaller size, and wherein said base is formed with means for confining said wall enclosure at a selected position.

3. A packaging system as claimed in claim 1 wherein said wall enclosure is cylindrical in configuration and is biased inwardly toward positions enclosing areas of smaller size, and wherein said cover and said base include means for limiting the inward movement of said wall enclosure.

4. A packaging system for encapsulating an article within a solid plastic foam comprising:
   (a) a base adapted to support an article to be encapsulated within a solid plastic foam material, said base being formed with a passageway in communication with an inlet orifice formed in said base and in communication with an outlet orifice formed in said base;
   (b) a wall enclosure disposed on said base and surrounding the area adapted to support the article on said base, said wall enclosure being disposed to form a mold cavity in communication with said outlet orifice;
   (c) a cover disposed across the upper end of said wall enclosure above the article;
   (d) means introducing an expandable plastic foam material in liquid form into said inlet orifice, said expandable plastic material in liquid form advances through said passageway and is discharged from said outlet orifice into the space defined by said wall enclosure, said cover and said base for encapsulating the article within the plastic foam material in liquid form, said plastic foam material in liquid form solidifies into a solid plastic foam material for packaging the article within the solid plastic foam material; and (e) said wall enclosure being convoluted for adjustable positioning to enclose areas of smaller size, (f) a ring disposed inwardly of said wall enclosure and in engagement with said base for limiting the inward movement of said wall enclosure.

5. A packaging system for encapsulating an article within a solid plastic foam material comprising:
   (a) a base adapted to support an article to be encapsulated within a solid plastic foam material, said base being formed with a passageway in communication with an inlet orifice formed in said base and in communication with an outlet orifice formed in said base;
   (b) a wall enclosure disposed on said base and surrounding the area adapted to support the article on said base, said wall enclosure being disposed to form a mold cavity in communication with said outlet orifice, said wall enclosure being cylindrical in configuration;
   (c) a cover disposed across the upper end of said wall enclosure above the article, said cover including a dependable cylindrical flange disposed externally of said wall enclosure for confining said wall enclosure to a selected position; and
   (d) means introducing an expandable plastic foam material in liquid form into said inlet orifice, said expandable plastic material in liquid form advances through said passageway and is discharged from said outlet orifice into the space defined by said wall enclosure, said cover and said base for encapsulating the article within the plastic foam material in liquid form, said plastic foam material in liquid form solidifies into a solid plastic foam material for packaging the article within the solid plastic foam material.

6. A packaging system for encapsulating an article within a solid plastic foam material comprising:
   (a) a base adapted to support an article to be encapsulated within a solid plastic foam material, said base being formed with a passageway in communication with an inlet orifice formed in said base and in communication with an outlet orifice formed in said base;
   (b) a wall enclosure disposed on said base and surrounding the area adapted to support the article on said base, said wall enclosure being disposed to form a mold cavity in communication with said outlet orifice;
   (c) a cover disposed across the upper end of said wall enclosure above the article;
   (d) means introducing an expandable plastic foam material in liquid form into said inlet orifice, said expandable plastic material in liquid form advances through said passageway and is discharged from said outlet orifice into the space defined by said wall enclosure, said cover and said base for encapsulating the article within the plastic foam material in liquid form, said plastic foam material in liquid form solidifies into a solid plastic foam material for packaging the article within the solid plastic foam material,
   (e) said wall enclosure including at least three rectilinear straps; and
   (f) magnetic means for holding said straps together to form a polygonal enclosure for the article to be encapsulated.

7. A packaging system as claimed in claim 6 wherein each of said straps includes a side-forming section and a flange integrally formed with said side-forming section, each of said flanges extending at right angles to its associated side-forming section.

8. A packaging system for encapsulating an article within a solid plastic foam material comprising:
   (a) a base adapted to support an article to be encapsulated within a solid plastic foam material, said base being formed with a passageway in communication with an inlet orifice formed in said base and in communication with an outlet orifice formed in said base;
   (b) a wall enclosure disposed on said base and surrounding the area adapted to support the article on said base, said wall enclosure being disposed to form a mold cavity in communication with said outlet orifice;
   (c) a cover disposed across the upper end of said wall enclosure above the article;
   (d) means introducing an expandable plastic foam material in liquid form into said inlet orifice, said expandable plastic material in liquid form advances through said passageway and is discharged from said outlet orifice into the space defined by said wall enclosure, said cover and said base for encapsulating the article within the plastic foam material in liquid form, said plastic foam material in liquid form solidifies into a solid plastic foam material for packaging the article within the solid plastic foam material;
   (e) a cord attached to a lower section of said wall enclosure; and
   (f) means defining a slot in an upper section of said wall enclosure,
   (g) said cord at its place of attachment with said wall enclosure and said slot being disposed in spaced apart relation across the space enclosed by said wall enclosure, said cord being of a length to extend across the space enclosed by said wall enclosure and through said slot.

9. A packaging system as claimed in claim 1 wherein said wall enclosure includes a plurality of rectilinear units forming a rectangle, each of units comprising a wall and a flange projecting at right angles to its associated wall at one end thereof, each of said walls at the other end thereof being disposed in abutment with the flange of the wall contiguous therewith, and magnetic means for holding said units together with the flange at one end of one unit abutting the other end of the wall of an adjacent unit.

10. A packaging system for encapsulating an article within a solid plastic foam material comprising:
   (a) a base adapted to support an article to be encapsulated within a solid plastic foam material, said base being formed with a passageway in communication with an inlet orifice formed in said base and in communication with an outlet orifice formed in said base;
   (b) a wall enclosure disposed on said base and surrounding the area adapted to support the article on said base, said wall enclosure being disposed to form a mold cavity in communication with said outlet orifice;

(c) a cover disposed in the space defined in said wall enclosure and adapted to be adjustably positioned at various heights above said base to limit the height of the plastic foam material within the space defined by said wall enclosure; and (d) means introducing an expandable plastic foam material in liquid form into said inlet orifice, said expandable plastic material in liquid form advances through said passageway and is discharged from said outlet orifice into the space defined by said wall enclosure, said cover and said base for encapsulating the article within the plastic foam material in liquid form, said plastic foam material in liquid form solidifies into a solid plastic foam material for packaging the article within the solid plastic foam material.

* * * * *